(12) United States Patent
Madhavan et al.

(10) Patent No.: US 8,484,566 B2
(45) Date of Patent: Jul. 9, 2013

(54) ANALYZING A FORM PAGE FOR INDEXING (75) Inventors: Jayant Madhavan, Fremont, CA (US); Alon Halevy, Los Altos, CA (US); David Ko, San Lorenzo, CA (US)

(73) Assignee: Google Inc., Mountain View, CA (US)

( * ) Notice: Subject to any disclaimer, the term of this patent is extended or adjusted under 35 U.S.C. 154(b) by 1047 days.

(21) Appl. No.: 11/872,621

(22) Filed: Oct. 15, 2007

(65) Prior Publication Data
US 2013/0031503 A1 Jan. 31, 2013

(51) Int. Cl.
*G06F 3/00* (2006.01)

(52) U.S. Cl.
USPC ............................ 715/742; 707/706; 707/707

(58) Field of Classification Search
USPC .................. 715/742; 707/706–707, 709, 711
See application file for complete search history.

(56) References Cited

U.S. PATENT DOCUMENTS

| | | | |
|---|---|---|---|
| 6,026,433 A * | 2/2000 | D'Arlach et al. ............. | 709/217 |
| 6,052,514 A * | 4/2000 | Gill et al. ....................... | 715/733 |
| 6,112,242 A * | 8/2000 | Jois et al. ....................... | 709/225 |
| 6,138,139 A * | 10/2000 | Beck et al. ..................... | 709/202 |
| 6,353,820 B1 * | 3/2002 | Edwards et al. ............. | 707/696 |
| 6,529,903 B2 * | 3/2003 | Smith et al. ............................ | 1/1 |
| 6,871,213 B1 * | 3/2005 | Graham et al. ............... | 709/205 |
| 6,920,607 B1 * | 7/2005 | Ali et al. ........................ | 715/206 |
| 7,380,204 B2 * | 5/2008 | Lomelin-Stoupignan et al. ............................. | 715/234 |
| 7,502,773 B1 * | 3/2009 | Shakib et al. .......................... | 1/1 |
| 7,536,389 B1 * | 5/2009 | Prabhakar et al. .................... | 1/1 |
| 7,634,490 B2 * | 12/2009 | Krieg et al. ............................ | 1/1 |
| 7,693,956 B2 | 4/2010 | Moricz et al. | |
| 7,716,303 B2 | 5/2010 | Moricz | |
| 7,730,160 B2 | 6/2010 | Moricz | |
| 2002/0198874 A1 * | 12/2002 | Nasr et al. ......................... | 707/3 |
| 2003/0009390 A1 * | 1/2003 | McBrearty et al. ............. | 705/26 |
| 2004/0107177 A1 | 6/2004 | Covill et al. | |
| 2006/0230033 A1 | 10/2006 | Halevy et al. | |
| 2006/0253773 A1 * | 11/2006 | Hsieh .............................. | 715/507 |
| 2006/0294052 A1 * | 12/2006 | Kulkarni et al. .................. | 707/1 |
| 2007/0022085 A1 * | 1/2007 | Kulkarni .......................... | 707/1 |
| 2007/0208703 A1 | 9/2007 | Shi et al. | |
| 2008/0097958 A1 | 4/2008 | Ntoulas et al. | |

OTHER PUBLICATIONS

L. Barbosa and J. Feire. Siphoning hidden-web data through keyword-based interfaces. In *SBBD*, 2004.

M. K. Bergman. The Deep Web: Surfacing Hidden Value. *Journal of Electronic Publishing*, 2001.

S. Byers, J. Freire, and C. T. Silva. Efficient acquisition of web data through restricted query interfaces. In *WWW Posters*, 2001.

J. P. Callan and M.E. Connell. Query-based sampling of text databases. *ACM Transactions on Information Systems*, 19(2):97-130, 2001.

(Continued)

*Primary Examiner* — Phenuel Salomon
(74) *Attorney, Agent, or Firm* — Middleton Reutlinger (57) ABSTRACT

Among other disclosure, a computer-implemented method of analyzing a form page for indexing includes identifying a form page that is configured for use in requesting any of multiple target pages. The form page includes multiple input controls. The method includes identifying at least one of the multiple input controls as being informative with regard to requesting the multiple target pages. The method includes updating an indexing record associated with the form page to reflect the identification.

22 Claims, 4 Drawing Sheets

OTHER PUBLICATIONS

Cars.com FAQ., web archive, http://web.archive.org//web/20061014232102/http://siy.cars.com/siy/gsg/faqGeneralInfor.jsp published on Oct. 14, 2006.

Forms in HTML Documents. http://www.w3.org/TR/html4/interact/forms.html, Dec. 24, 1999, Retrieved on Sep. 8, 2009.

B. He and K. Chang. Automatic Complex Schema Matching across Web Query Interfaces: A Correlation Mining Approach. *TODS*, 31(1), 2006.

B. He, M. Patel, Z. Zhang, and K. C.-C. Chang. Accessing the Deep Web: A survey. *Communications of the ACM*, 50(5):95-101, 2007.

P.G. Ipeirotis and L. Gravano. Distributed Search over the Hidden Web: Hierarchical Database Sampling and Selection. In *VLDB*, pp. 394-405, 2002.

J. Madhavan, S. Jeffery, S. Cohen, X. Dong, D. Ko, C. Yu, and A. Halevy. Web-scale Data Integration: You can only afford to Pay as you Go. In *CIDR*, 2007.

A. Ntoulas, P. Zerfos, and J. Cho. Downloading Textual Hidden Web Content through Keyword Queries. In *JCDL*, pp. 100-109, 2005.

S. Raghavan and H. Garcia-Molina. Crawling the Hidden Web. In *VLDB*, pp. 129-138, 2001.

G. Salton and M. J. McGill, *Introduction to Modern Information Retrieval*, 1983.

J. Wang, J.-R. Wen, F. Lochovsky, and W.-Y. Ma. Instance-based Schema Matching for Web Databases by Domain-specific Query Probing. In *VLDB*, 2004.

W. Wu, C. Yu, A. Doan, and W. Meng. An Interactive Clustering-based Approach to Integrating Source Query Interfaces on the Deep Web. In *SIGMOD*, 2004.

Ipeirotis, Panagiotis G., Ntoulas, Alexandros, Cho, Junghoo, and Gravano, Luis, "Modeling and Managing Content Changes in Text Databases", *Data Engineering*, 2005, ICDE 2005, 21$^{st}$ International Conference, Apr. 5-8, 2005. pp. 606-617.

Gravano, Luis, Ipeirotis, Panagiotis G., and Sahami, Mehran, "QProber: A System for Automatic Classification of Hidden-Web Databases", *ACM Transaction on Information Systems*, vol. 21, No. 1, Jan. 2003, pp. 1-41.

Madhavan, Jayant, Halevy, Alon, Cohen, Shirley, Dong, Xin (Luna), Jeffery, Shawn R., Ko, David, and Yu, Cong, "Structured Data Meets the Web: A Few Observations", *IEEE Computer Society Technical Committee on Data Engineering*, Copyright 2006.

'Google Diving into Indexing the Deep Web' [online], SEO by the SEA, [retrieved on Dec. 7, 2007] [published on Oct. 19, 2006]. Retrieved from the intent: http://www.seobythesea.com/?p=337.

U.S. Patent Application, "Searching Through Content Which is Accessible Through Web-Based Forms" filed Apr. 5, 2006, Inventors-Alon Y. Halevy, Jayant Madhavan and David H. Ko, 58 pages.

* cited by examiner

ANALYZING A FORM PAGE FOR INDEXING

TECHNICAL FIELD

This document relates to analyzing a form page.

BACKGROUND

There are many HTML forms used on the World Wide Web (WWW). HTML forms require users who want access to the content behind the form to fill in or select values for one or more different input fields in the form and make a submission. The pages resulting from such submissions can be very useful to web users. The content that lies hidden behind such forms is enormous by some estimates. This notion is often referred to by the terms Deep Web, Hidden Web or Invisible Web.

However, result pages obtained from a form page may not be indexed by search engines if the web-crawler does not have the ability to automatically fill out HTML forms. As such, the web crawler may not be able to detect the hidden pages. This presents a gap in the coverage of search engines (and hence the names Hidden, Deep or Invisible Web for such content).

An approach of creating URLs corresponding to all possible combinations of input-values can provide either or both of the following results. First, no valid HTML page may exist for the URL created by appending input-name-value pairs to the form action. Second, because there may be numerous possible combinations of input values for the different input fields, it is possible that a very large number of URLs must be created (corresponding to each submission of a combination of input values). For example, cars.com has an inventory of about 50,000 cars, but the number of possible form submissions for their search page on www.cars.com is more than a million.

SUMMARY

The invention relates to form pages.

In a first aspect, a computer-implemented method of analyzing a form page for indexing includes identifying a form page that is configured for use in requesting any of multiple target pages. The form page includes multiple input controls. The method includes identifying at least one of the multiple input controls as being informative with regard to requesting the multiple target pages. The method includes updating an indexing record associated with the form page to reflect the identification.

Implementations can include any, all or none of the following features. Identifying the at least one of the multiple input controls as being informative with regard to requesting the multiple target pages can include generating a first set of page identifiers, each page identifier having a different value for at least a first one of the multiple input controls; retrieving any of the multiple target pages that are associated with the generated first set of page identifiers; and analyzing at least some of the retrieved target pages with regard to a predefined difference standard. The analysis can indicate that the retrieved target pages do not satisfy the difference standard, and the indexing record can be updated to reflect that the first input control is not informative with regard to requesting the multiple target pages. The analysis can indicate that the retrieved target pages satisfy the difference standard, and the indexing record can be updated to reflect that the first input control is informative with regard to requesting the multiple target pages. The indexing record can be updated by storing therein the generated first set of page identifiers. The method can further include subsequently testing whether the first input control in combination with at least a second one of the multiple input controls is informative with regard to requesting the multiple target pages. The subsequent testing can involve: generating a second set of page identifiers, each page identifier having a constant value for the first input control and a different value for at least a second one of the multiple input controls; obtaining a sample of the second set of page identifiers; retrieving those of the multiple target pages that are associated with the obtained sample of page identifiers; analyzing at least some of the retrieved target pages with regard to the predefined difference standard; and updating the indexing record associated with the form page to reflect an outcome of the analysis. The subsequent testing can include: generating a second set of page identifiers, each page identifier having a constant value for the first input control and a different value for at least a second one of the multiple input controls; retrieving any of the multiple target pages that are associated with the generated second set of page identifiers; analyzing at least some of the retrieved target pages with regard to the predefined difference standard; and updating the indexing record associated with the form page to reflect an outcome of the analysis. The method can further include determining that at least some of the multiple input controls are informative with regard to requesting the multiple target pages; defining pairs of the multiple input controls such that at least one input control in each pair has been determined to be informative; and performing the subsequent testing on the defined pairs;

wherein the indexing record is updated, based on the subsequent testing performed on the defined pairs, to reflect whether any of the defined pairs of input controls are informative with regard to requesting the multiple target pages. The method can further include performing additional subsequent testing by: forming input control tuples by extending those of the defined pairs found to be informative with at least another one of the multiple input controls; determining whether any of the formed input control tuples are informative with regard to requesting the multiple target pages; and updating the indexing record based on the determination. The predefined difference standard can include that a predefined share of the retrieved multiple pages have different content than remaining ones of the retrieved multiple pages. The difference in content can be determined by extracting words from the retrieved multiple pages according to a relevancy criterion. At least one of the input controls can be configured to receive text string input, and generating the first set of page identifiers can include formulating at least one text string input value for the input control. The method can further include identifying at least another one of the multiple input controls as not being informative with regard to requesting the multiple target pages; selecting a default value among multiple values of the other identified input control; and updating the indexing record with the default value, wherein the other identified input control is to be set to the default value during page collection for indexing.

In a second aspect, a computer program product is tangibly embodied in a computer-readable storage medium and includes instructions that when executed by a processor perform a method for analyzing a form page for indexing. The method includes identifying a form page that is configured for use in requesting any of multiple target pages, the form page including multiple input controls. The method includes identifying at least one of the multiple input controls as being informative with regard to requesting the multiple target pages. The method includes updating an indexing record associated with the form page to reflect the identification.

In a third aspect, a system includes an indexing module configured to retrieve and index content from pages based on an indexing record. The system includes a form processing module configured to: identify a form page that is configured for use in requesting any of multiple target pages, the form page including multiple input controls; identify at least one of the multiple input controls as being informative with regard to requesting the multiple target pages; and update the indexing record associated with the form page to reflect the identification.

Implementations can include any, all or none of the following features. The form processing module can further be configured to: generate a first set of page identifiers, each page identifier having a different value for at least a first one of the multiple input controls; retrieve any of the multiple target pages that are associated with the generated first set of page identifiers; and analyze at least some of the retrieved target pages with regard to a predefined difference standard. At least one of the input controls can be configured to receive text string input, and the form processing module can formulate at least one text string input value for the input control in generating the first set of page identifiers. The form processing module can further be configured to subsequently test whether the first input control in combination with at least a second one of the multiple input controls is informative with regard to requesting the multiple target pages. The form processing module can further be configured to: determine that at least some of the multiple input controls are informative with regard to requesting the multiple target pages; define pairs of the multiple input controls such that at least one input control in each pair has been determined to be informative; and perform the subsequent testing on the defined pairs; wherein the indexing record is updated, based on the subsequent testing performed on the defined pairs, to reflect whether any of the defined pairs of input controls are informative with regard to requesting the multiple target pages. The form processing module can further be configured to perform additional subsequent testing by: forming input control tuples by extending those of the defined pairs found to be informative with at least another one of the multiple input controls; determining whether any of the formed input control tuples are informative with regard to requesting the multiple target pages; and updating the indexing record based on the determination.

Advantages of implementations can include any, all or none of the following. Search engine indexing can be improved, for example by including web pages that result from submissions on a form page. Form pages can be processed more efficiently by determining informativeness of input controls. Indexing records can be generated that reflect relevant aspects of a form page. The number of URLs fetched by a web crawler of a search engine can be reduced, since indexing records can reflect only the informative relevant aspects of a form page.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
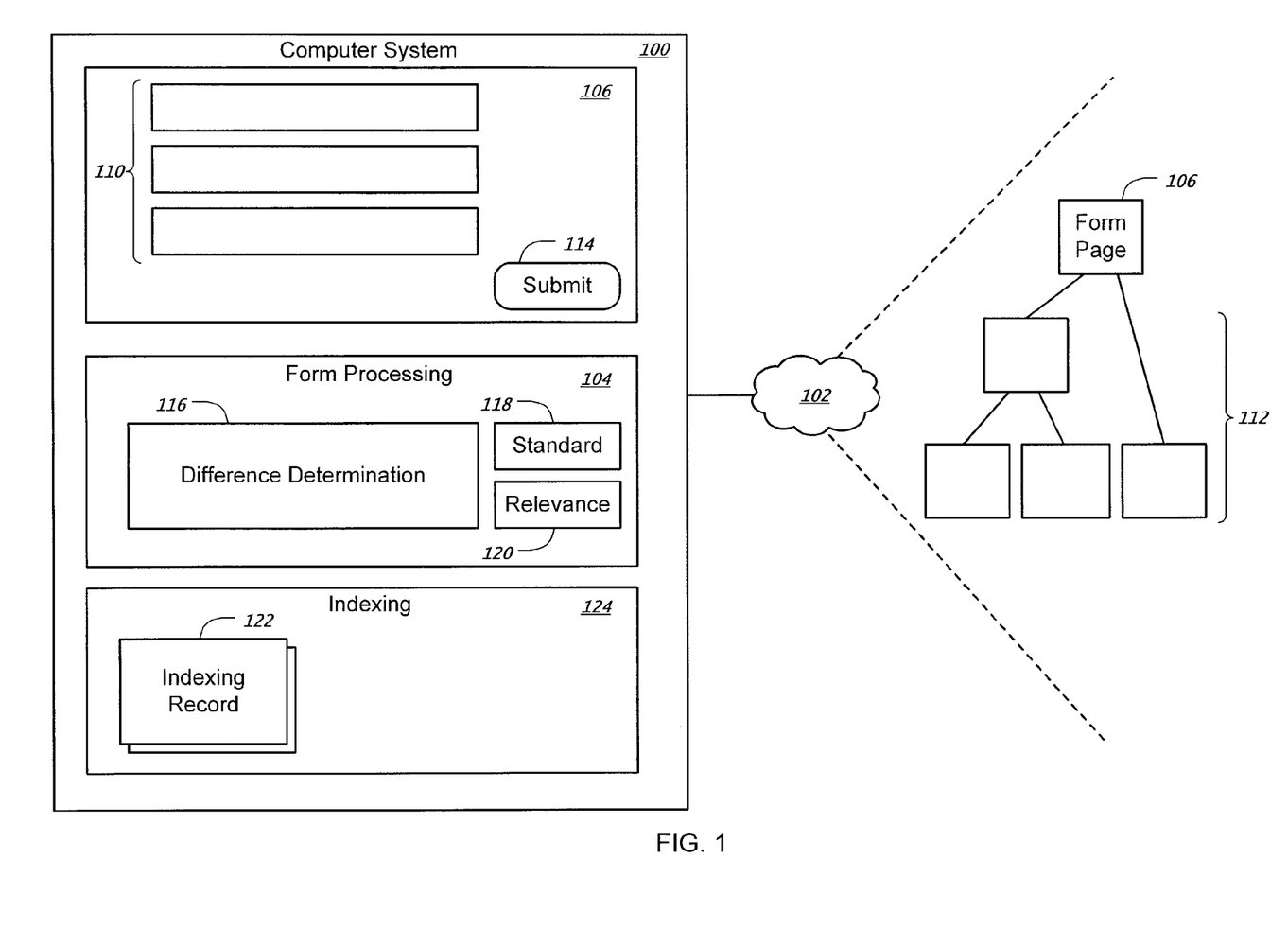
FIG. 1 shows an example of a block diagram of a system that can analyze a form page for indexing.

FIG. 1 shows an example of a block diagram of a system 100 that can analyze a form page for indexing. For example, the system 100 can be configured to perform indexing on pages available in a computer network 102, such as on the Internet, based on a list of uniform resource locators (URLs) for the pages that are to be indexed. Using the list of URLs, the system 100 can retrieve content from the corresponding pages and index that content. Such a created index can for example be used by a search index to provide results to a query entered by a user. Particularly, the system 100 can identify a form page, such as an Internet page with HTML code that generates a form to be completed by a user, that serves as an entryway to a number of other pages. For such a form page, the system 100 can for example determine whether any or all input controls on the form page is informative with regard to requesting the other pages. For example, any input control can be deemed informative if different settings of the control provide pages that are sufficiently different from each other that one may want to take all of them into account when performing an indexing. As such, the informative control can be said to be one that is helpful for indexing, in that it generates pages that one may want to include in an indexing record.

For this and other purposes, the system 100 here includes a form processing module (FPM) 104. For example, the FPM 104 can analyze one or more form pages 106 and determine whether any of its input controls are informative. When presented in a graphical user interface (GUI) 108, the form page 106 can provide one or more input controls 110 operable by a user. For example, the form page 106 can be published by a car manufacturing company to allow online users to browse a wide selection of car models, configurations and optional vehicle choices that the company offers its customers. As such, the form page 106 can be considered an entryway to an, in this example, large number of pages 112. Particularly, the pages 112 can correspond to particular settings of the input controls 110. That is, each one of the pages 112 can be designed for a specific choice of vehicle model, configuration and options, and a user reaches this page by selecting those settings using the input controls 110 and activating a Submit control 114. When reaching the individual page, then, the user can be presented with information and/or images, to name a few examples, of the vehicle according to the input values that the user entered.

The number of the pages 112 that exist can be different depending on the number of the input controls 110 and/or how many alternative input values each one of them accepts. In some implementations, the pages 112 can range in the number of millions of pages or more. From an indexing perspective, it can be of interest to catalogue the pages 112 in as representative a way as possible. In some situations, this can drive the effort towards indexing pages for all of the possible combinations of settings in the input controls 110.

However, in some examples some or many of the pages 112 are identical or very similar to each other. For example, two pages relating to car models can differ in the color of seat fabric for the vehicle but otherwise be identical. Moreover, it is possible that no page exists for certain combinations of the possible input values in the input controls 110. To continue the example with the form page from the vehicle manufacturer, some configurations or options may not be offered with certain models of cars, and these "invalid" combinations of input values therefore have no corresponding page among the pages 112. The total universe of theoretical settings of the input controls 110 need therefore not be an indication of how many of the pages 112 must be considered to obtain a representative view of the entire collection.

The FPM 104 can analyze the form page 106 in an attempt to determine which of the input controls 110 are informative with regard to retrieving the pages 112. For example, an input control can be considered informative if significantly different pages are retrieved depending on the value entered for that input control, such as those for different car models. For example, an input or set of inputs can be considered informative if the collection of URLs it generates has a sufficient number of distinct web pages. Two web pages in the generated collection of URLs are deemed to be similar (and hence not distinct) if the contents of the web pages are substantially identical or substantially similar. As an example to the contrary, an input control can be considered not to be informative if identical or substantially similar pages are retrieved for every value entered for that input control, such as those for different seat fabric colors.

The comparison of the various pages 112 can be performed in a difference determination 116 that in this example is part of the FPM 104. For example, the difference determination 116 can involve computing a signature for each web page in the generated collection. The FPM 104 can perform the difference determination 116 to two or more retrieved pages to decide if they are sufficiently similar, or sufficiently different, according to a standard 118. For example, if the difference of two compared pages does not rise to the level required by the standard 118, the pages can be deemed similar by the FPM 104. As another example, if the difference of two compared pages meets or exceeds the level required by the standard 118, the pages can be deemed different by the FPM 104. The number of distinct signatures in the collection can then be counted.

There are many possible choices for computing signatures, including, but not limited to:

Analyzing or considering the entire HTML code for the webpage. For example, this approach can involve parsing the HTML code of the respective pages and deriving a fingerprint measure from it that is indicative of the page content. In some implementations, this approach requires that formatting included in the code be removed to ensure that it does not interfere with the processing. For example, an approximate fingerprint measure can be obtained by attempting to ignore HTML boilerplate content while parsing contents of the page.

Analyzing or considering only the textual content of the retrieved pages, i.e., the words that are visible to the user. In some implementations, this approach can result in false or misleading results due to, for example, less relevant text such as advertisements or banners.

Extracting words from the pages that are most relevant to the pages' content. For example, this can be done by analyzing frequency of words, such as whether they occur often or seldom; placement of words, such as whether they occur in titles or headlines; emphasis of words, such as whether they are capitalized or highlighted. This analysis of the difference in content can be determined by extracting words from the retrieved multiple pages according to a relevancy criterion 120. Based on an analysis of the words, a short signature can be created that summarizes the page's HTML text.

The analysis of page distinctiveness having been done, the input or set of inputs can then be deemed informative if the number of distinct web page signatures is at least 25% of the total number of web pages, to name just one example. That is, when 100 web pages can be generated, the input or set of inputs can be deemed informative if there are more than 25 distinct web page signatures computed from them. Other definitions for informativeness based on the contents of the generated pages can be used.

The FPM 104 can create one or more indexing records 122 based on its analysis. An indexing record can indicate whether any of the input controls 110 are informative with regard to retrieving the pages 112. For example, the indexing record 122 can include URLs for any of the pages 112 that the FPM 104 found to be sufficiently similar to justify indexing. In contrast, URLs for those pages that were found to be identical or substantially similar to other pages may be deliberately omitted, or deleted, from the indexing record 122.

The system 100 can include an indexing module 124 that is configured to retrieve and index content from any of the pages 112 based on the indexing record 122. For example, when the indexing record 122 includes URLs of pages to be indexed, the indexing module 124 can access the URLs and use them to retrieve the corresponding pages. The indexing module can then store results of the indexing according to its specifications, for example to provide an index to be used by a search engine. In some implementations, the FPM 104 can update or modify the indexing record(s) 122 one or more times, and this can provide the indexing module 124 with more up-to-date information of which of the pages 112 are to be retrieved.

The following is an example of how the FPM 104 can retrieve those of the pages 112 that correspond to a particular setting of the input controls 110. A HTML form can include an action that identifies the server and the program that processes the form submission and the result page generation. An HTML form can also have a series of inputs that can be of various types, e.g., select menus, text boxes, radio buttons, submit buttons. Consider, for example, a GET forms according to the HTML nomenclature. For GET forms, upon submission a URL of the form action?$i_1$=$v_1$&$i_2$=$v_2$& ... &$i_n$=$v_n$ is created where "action" is the action of the form "$i_1$", "$i_2$", ... "$i_n$" are the names of the inputs and "$v_1$", "$v_2$", ..., "$v_n$" are the values submitted for the inputs. HTML submissions can also include hidden inputs and/or submit inputs. Such inputs can be trivially to the end of the generated URLs by considering the other inputs.

HTML forms can be filled out by creating mappings between schemas and inputs in HTML forms. Schemas can be created for each domain and can contain attributes and values that are pre-defined for each attribute. A mapping from a form input to an attribute can identify the values that can be filled into that input. Other examples of filling out online forms are discussed in pending patent application Ser. No. 11/399,568, filed Apr. 5, 2006 and entitled "Searching through content which is accessible through web-based forms", the entire contents of which are hereby incorporated by reference.

The possible input values available for any and all of the input controls 110 can be determined in any of a number of ways. For example, a select menu typically has a number of input values defined in code for the page so that the alternatives can be presented when the page is displayed to a user. As another example, radio buttons can be treated identical to select menus such that each check-box can be considered as a select menu with two (yes/no) input values. Likewise, if values are known for a text input control, they can also be treated like a select menu. These text values can be obtained in a variety of ways including those described in the pending patent application Ser. No. 11/399,568. Accordingly, in some implementations, at least one of the input controls 110 can be configured to receive text string input. In such examples, the FPM 104 can generate URLs for retrieving pages by formulating at least one text string input value for such an input control.

Figure 2:
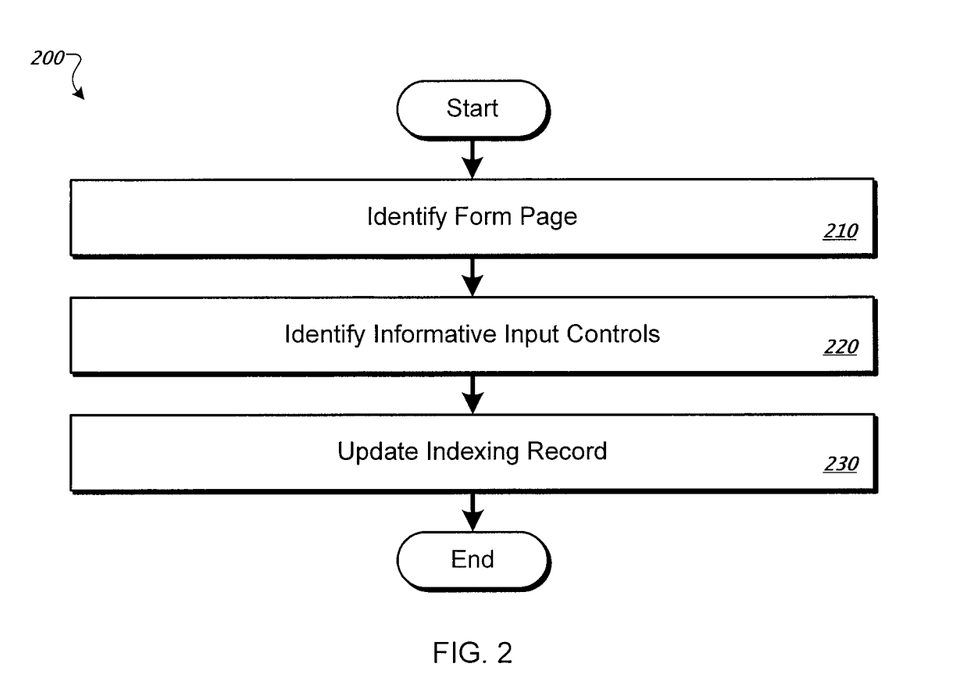
FIG. 2 shows an example of a flow chart of a method for analyzing a form page for indexing.

FIG. 2 shows an example of a flow chart of a method 200 for analyzing a form page for indexing. The method 200 can be performed by a processor executing instructions in a computer-readable medium, for example in the system 100.

As shown, method 200 includes a step 210 of identifying a form page. The form page includes multiple input controls and is configured for use in requesting any of multiple target pages. For example, the FPM 104 can identify the form page 106 relating to an automotive manufacturer, the page 106 including the input controls 110 and being associated with the pages 112.

Method 200 includes a step 220 of identifying at least one of the multiple input controls as being informative with regard to requesting the multiple target pages. For example, the FPM 104 can identify any of the input controls 110 that relates to the vehicle model as being informative.

Method 200 includes a step 230 of updating an indexing record associated with the form page to reflect the identification. For example, the FPM 104 can create and/or update the indexing record 122 for the form page 106 by including therein the URLs of those pages that are to be included in the next indexing operation.

The following is an example of how page identifiers such as URLs can be generated. Multiple distinct URLs can be created by iterating over the different possible values for the select input. Assume that http://x.y/z is the action for the form. Further assume that the input name for the input control (e.g., a select menu) is J and its corresponding values were $j_1, \ldots, j_n$. Then the FPM 104 can create the URLs http:x.y/z?J=$j_1$;
http://x.y/z?J=$j_2$;
...
http:x.y/z?J=$v_n$.

Particularly, the values of the input control J are varied over the range $j_1, \ldots, j_n$. Generally, three cases can be identified. First if the contents are distinct between the various obtained pages, then all values can be used. The FPM 104 can then download and analyze the pages corresponding to the respective generated URLs. Second, if the contents are not distinct between the various obtained pages, but no HTML/HTTP errors were encountered, then one default value can be selected and used (e.g., the first value of the control). For example, the indexing record can be updated with the default value, such that the non-informative input control is set to the default value during page collection for indexing. Third, if any of the URLs result in HTML/HTTP errors, this indicates that trying different values is in itself not sufficient to perform the indexing. Another form of indexing, such as assigning the form to a manual indexing operator, can then be used.

If, in contrast, each of the resulting pages has distinct content, then the select input can be deemed an informative input. Each such resulting can be added to the index of a search engine. On the other hand, if each of the URLs has identical or similar content, then the input can be deemed uninformative. One result of such a determination can be that the FPM 104 need not generate all the possible URLs. For example, when the FPM 104 is seeking to define a minimal set of URLs for a particular control on a form page, the occurrence of identical or similar results can prompt the FPM 104 to decide that the minimal set has size 1.

Figure 3:
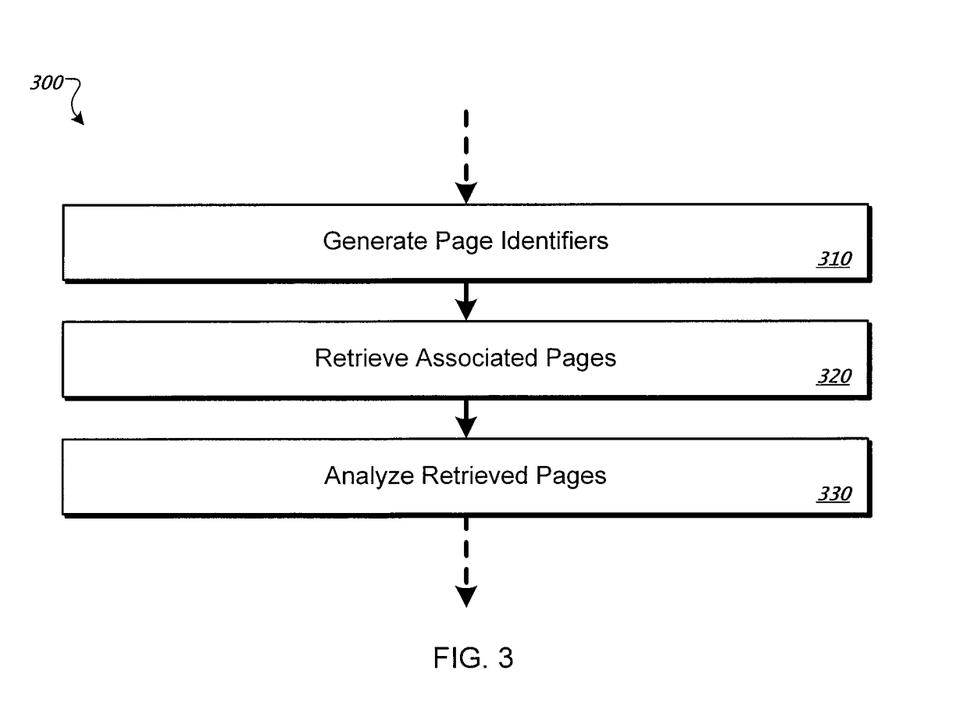
FIG. 3 shows another example of a flow chart of a method for analyzing a form page for indexing.

FIG. 3 shows an example of a flow chart of a method 300 for analyzing a form page for indexing. The method 300 can be performed by a processor executing instructions in a computer-readable medium, for example in the system 100. In some implementations, the method 300 can form, or be included in, the step 220 of method 200 described above.

Method 300 includes a step 310 of generating a first set of page identifiers. Each page identifier has a different value for at least a first one of multiple input controls. For example, the FPM 104 can generate URLs with different values (e.g., values j1, . . . , jn) for an input control that relates to selecting the vehicle model at a car manufacturer's site.

Method 300 includes a step 320 of retrieving any of the multiple target pages that are associated with the generated first set of page identifiers. For example, the FPM 104 can retrieve those of the pages 112 that correspond to the generated URLs.

Method 300 includes a step 330 of analyzing at least some of the retrieved target pages with regard to a predefined difference standard. For example, the FPM 104 can perform the difference determination 116 to evaluate whether any of the retrieved pages 112 satisfy the standard 118.

In some situations, the analysis in step 330 indicates that the retrieved target pages do not satisfy the difference standard. An indexing record can then be updated to reflect that the first input control is not informative with regard to requesting the multiple target pages. For example, the FPM 104 can omit the corresponding URLs from the indexing record 104 or otherwise note therein that the particular input control being tested has been deemed not informative.

In some situations, the analysis in step 330 indicates that the retrieved target pages satisfy the difference standard. An indexing record can then be updated to reflect that the first input control is informative with regard to requesting the multiple target pages. For example, the FPM 104 can include the corresponding URLs from the indexing record 104 or otherwise note therein that the particular input control being tested has been deemed informative.

Generally, for a form page that has k input controls, such as select menus, the FPM 104 can seek to determine if each of the select menus is informative or not. For example, the informativeness of the first input control can be tested by trying different values for that input while selecting one or mroe default values for the other k−1 inputs. Assume here that there are 3 inputs I, J, and K. Let $i_1, i_2, \ldots, i_n$ be the possible input values for I, and likewise J and K have their sets of possible input values, which may or may not be the same number as the ones for I. The FPM 104 can select $i_1$, $j_1$, and $k_1$ be the default values used for I, J, and K. Then the URLs for testing the informativeness of I will be:

http://x.y/z?I=$i_1$&J=$j_1$&K=$k_1$;
http://x.y/z?I=$i_2$&J=$j_1$&K=$k_1$;
...
http://x.y/z?I=$i_n$&J=$j_1$&K=$k_1$.

Note that the values for I iterate over all values while the controls J and K are kept at their specified default values. As such, the above URLs can be used for testing the individual informativeness of the input I.

Analogously, for testing the informativeness of the input control J the URLs will be:

http://x.y/z?I=$i_1$&J=$j_1$&K=$k_1$;
http://x.y/z?I=$i_1$&J=$j_2$&K=$k_1$;
...
http://x.y/z?I=$i_1$&J=$j_n$&K=$k_1$.

Note that the values for J iterate over all values while the controls I and K are kept at their specified default values. As such, the above URLs can be used for testing the individual informativeness of the input J. Another set of URLs can similarly be generated where the values for K iterate over all values while the controls I and J are kept at their specified default values.

The above examples have described how it can be determined for an individual input control whether it is informative with regard to requesting multiple pages. Some examples of determining the status of being (or not being) informative, for more than one input control, will now be described. As will be described, this can involve generalizing the previously described examples.

For example, given inputs I, J, K, the FPM 104 can consider the pairs IJ, JK, and IK and test each of them. The input pair IJ can be tested for informativeness by analyzing the content of pages whose URLs are created by considering all pairs of values for I and J while keeping K constant at a default value. The number of candidate URLs generated for each pair of inputs can be large. When considering a pair of with m and n input values respectively, the FPM 104 can create m*n URLs. This expense can be mitigated by performing the informativeness analysis on only a sampling of the m*n URLs.

The number of input pairs can be large for a given HTML form. For a form with k inputs, there are $^kC_2$=(k)*(k−1)/2 pairs of inputs that might have to be tested for informativeness. For three inputs, there are only 3 pairs (as in the IJK example described above), and for 10 inputs there are 45 pairs. The following intuition can be used to reduce the number of pairs to be tested: only pairs that have at least one input already known to be informative are considered. For example, if K were the only informative input among I, J and K (when tested individually as described above), then only consider the pairs JK and IK (and not IJ). This criterion can reduce the number of tested pairs.

The above process can be generalized to testing of single inputs and pairs of inputs, for example as in the following schematical process steps, which can be carried out by the FPM 104:

Step 1: Select default values for each of the k inputs.
Step 2: Determine the set of informative inputs that are individually informative.
Step 3: Construct a candidate set of input pairs consisting of pairs where at least one input is known to be informative.
Step 4: Determine the input pairs that are informative by testing all (or a sampling of) the URLs for the input pair, while setting other inputs to their default values.
Step 5: Add the URLs generated for the testing of each informative input and each informative input pair to the minimal set.

If the pages generated by trying different values for the input pair JK are distinct from each other, but are very similar to those already analyzed for J and K separately, then J and K may not be considered that useful and the FPM 104 can deem the pair to be uninformative. Hence, it can be useful to measure distinctness of content relative to all prior analyzed URLs from that form page.

The above Steps 1-5 can be further extended to the general case of tuples of inputs of any size (not necessarily only pairs). For example, informative input pairs can be extended to input triples. In some implementations, only those triples need to be considered where a subset (pair of two inputs) was known to be informative. For example, in the example with inputs I, J and K, the combination IJK need not be tested if neither of JK and IK are informative (note that IJ was not tested because neither I nor J were individually informative). This process of extending input tuples followed by testing can continue until no further informative input tuples can be found/extended.

The following schematical process steps can be carried out by the FPM 104:

Step 1: Test each input to determine if it if individually informative.
Step 2: Define Cand = Set of singleton tuples, one for each of the informative inputs.
Step 3: Define α= Cand
Step 4: While (Cand is not empty) {
  Step 4A: NewCand = Create new candidates by extending each of tuples of inputs in Cand with different additional inputs.
  Step 4B: Test each of the input tuples in NewCand to determine if they are informative.
  Step 4C: Cand = Input tuples in NewCand that were found to be informative.
  Step 4D: α= α+ Cand
}
Step 5: Minimal Set = Urls generated from each of the input tuples in α.

In the worst case, the algorithm might generate the complete Cartesian product of the input values for each of the inputs. But in the common case, the algorithm might terminate earlier, exploring only the input tuples that can generate distinct content. Thus, the algorithm can advantageously explore the space of the Cartesian product by exploring only combinations that need to be considered.

For example, consider a form with inputs I, J, K, and L. Suppose J and K were tested to be informative. The FPM 104 can then test the pairs IJ, IK, JK, JL, KL for informativeness. Suppose further that, of these, only JK was found to be informative. Then the FPM 104 can continue to test IJK and JKL for informativeness. Suppose further that none of these are informative; then the FPM 104 may not need to test IJKL for informativeness. In contrast, if one of the combinations is informative then the FPM 104 can test IJKL.

Figure 4:
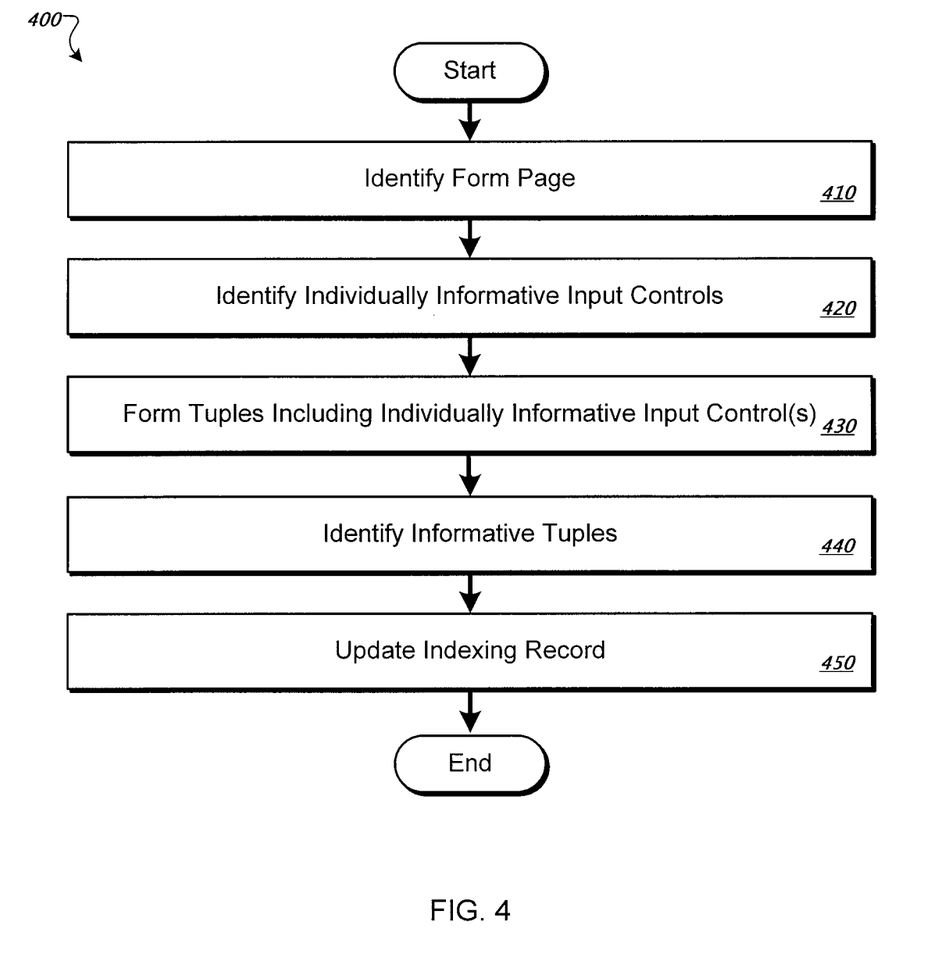
FIG. 4 shows another example of a flow chart of a method for analyzing a form page for indexing.

FIG. 4 shows an example of a flow chart of a method 400 for analyzing a form page for indexing. The method 400 can be performed by a processor executing instructions in a computer-readable medium, for example in the system 100.

As shown, method 400 includes step 410 of identifying a form page and step 420 of identifying individually informative input controls. In some implementations, these steps can be similar or identical to the steps 210 and 220 described above.

Method 400 includes step 430 of forming tuples including at least one individually informative input control. For example, the FPM 104 can form the pair IJ of the input controls I and J, or it can form triplets IJK or JKL, as discussed above.

Method 400 includes step 440 of Identifying informative tuplets. For example, the FPM 104 can identify the tuplets IJ and/or JKL as informative.

Method 400 includes step 450 of updating an indexing record based on the identification. In some implementations, these steps can be similar or identical to the step 230 described above.

Figure 5:
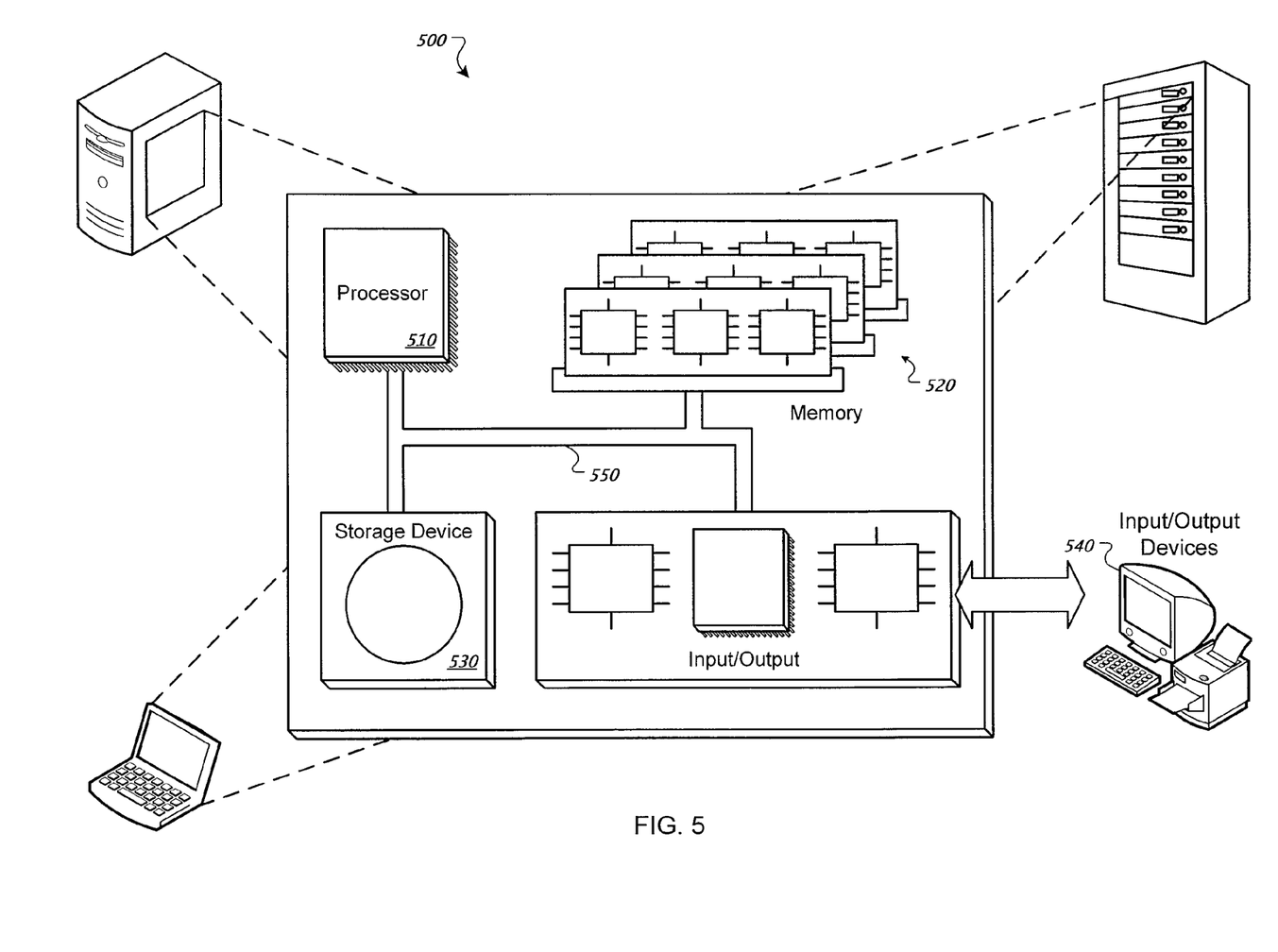
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method of analyzing a form page for indexing, the method comprising:
    identifying a form page that is configured for use in requesting any of multiple target pages, the form page including multiple input controls;
    entering a first set of values in the input controls, including a first value for a first input control, and receiving a first requested target page in response;
    entering a second set of values in the input controls, including a second value for the first input control, and receiving a second requested target page in response;
    performing a first comparison between the first and second requested target pages with regard to a predefined difference standard;
    updating an indexing record associated with the form page to reflect the first comparison;
    determining that at least some of the multiple input controls retrieve target pages that satisfy the difference standard;
    defining pairs of the multiple input controls such that at least one input control in each pair has been determined to retrieve target pages that satisfy the difference standard;
    wherein the second comparison is performed between respective target pages for the defined pairs;
    wherein the indexing record is updated to reflect whether any of the defined pairs of input controls provide target pages that satisfy the difference standard.

2. The computer-implemented method of claim 1, wherein the first comparison indicates that the first and second requested target pages do not satisfy the difference standard, and wherein the indexing record is updated so that the first input control is not provided with different values in indexing.

3. The computer-implemented method of claim 1, wherein the first comparison indicates that the first and second requested target pages satisfy the difference standard, and wherein the indexing record is updated so that the first input control is provided with different values in indexing.

4. The computer-implemented method of claim 3, wherein the indexing record is updated by storing therein page identifiers for the first and second requested target pages.

5. The computer-implemented method of claim 3, further comprising subsequently determining whether the first input control in combination with at least a second one of the multiple input controls satisfies the difference standard.

6. The computer-implemented method of claim 5, wherein determining whether the first input control in combination with at least the second one of the multiple input controls satisfies the difference standard involves:
 entering a third set of values in the input controls, including a constant value for the first input control and a third value for a second input control, and receiving a third requested target page in response;
 entering a fourth set of values in the input controls, including the constant value for the first input control and a fourth value for the second input control, and receiving a fourth requested target page in response;
 performing a second comparison between the third and fourth requested target pages with regard to the predefined difference standard
 updating the indexing record associated with the form page to reflect the second comparison.

7. The computer-implemented method of claim 6, wherein the third and fourth requested target pages are samples.

8. The computer-implemented method of claim 1, further comprising:
 forming input control tuples by extending those of the defined pairs found to provide target pages that satisfy the difference standard with at least another one of the multiple input controls;
 performing a third comparison between respective target pages for the formed input control tuples; and
 updating the indexing record based on the third comparison.

9. The computer-implemented method of claim 1, wherein the predefined difference standard comprises that the first requested target page has different content than the second requested target page.

10. The computer-implemented method of claim 9, wherein the difference in content is determined by extracting words from the first and second requested target pages according to a relevancy criterion.

11. The computer-implemented method of claim 1, wherein the first input control is configured to receive text string input, and wherein the first value includes at least one text string input value for the first input control.

12. The computer-implemented method of claim 1, further comprising:
 identifying at least a second one of the multiple input controls as providing target pages that do not satisfy the difference standard;
 selecting a default value among multiple values of the second input control; and
 updating the indexing record with the default value, wherein the second input control is to be set to the default value during page collection for indexing.

13. A computer program product tangibly embodied in a computer-readable storage medium and comprising instructions that when executed by a processor perform a method for analyzing a form page for indexing, the method comprising:
 identifying a form page that is configured for use in requesting any of multiple target pages, the form page including multiple input controls;
 entering a first set of values in the input controls, including a first value for a first input control, and receiving a first requested target page in response;
 entering a second set of values in the input controls, including a second value for the first input control, and receiving a second requested target page in response;
 performing a first comparison between the first and second requested target pages with regard to a predefined difference standard;
 updating an indexing record associated with the form page to reflect the first comparison;
 determining that at least some of the multiple input controls retrieve target pages that satisfy the difference standard;
 defining pairs of the multiple input controls such that at least one input control in each pair has been determined to retrieve target pages that satisfy the difference standard;
 wherein the second comparison is performed between respective target pages for the defined pairs;
 wherein the indexing record is updated to reflect whether any of the defined pairs of input controls provide target pages that satisfy the difference standard.

14. The computer program product of claim 13, wherein the first input control is configured to receive text string input, and wherein the method further comprises formulating at least one text string input value for the first input control.

15. The computer program product of claim 13, wherein the method further comprises subsequently determining whether the first input control in combination with at least a second one of the multiple input controls provide requested target pages that satisfy the difference standard.

16. The computer program product of claim 15, wherein the method further comprises:
 determining that at least some of the multiple input controls retrieve target pages that satisfy the difference standard;
 defining pairs of the multiple input controls such that at least one input control in each pair has been determined to retrieve target pages that satisfy the difference standard; and
 performing a second comparison between respective target pages for the defined pairs;
 wherein the indexing record is updated to reflect whether any of the defined pairs of input controls provide target pages that satisfy the difference standard.

17. The computer program product of claim 16, wherein the method further comprises:
 forming input control tuples by extending those of the defined pairs found to provide target pages that satisfy the difference standard with at least another one of the multiple input controls;
 performing a third comparison between respective target pages for the formed input control tuples; and
 updating the indexing record based on the third comparison.

18. A system comprising:

a processor; and a computer-readable storage medium having stored therein instructions that, when executed, cause the processor to generate:

an indexing module configured to retrieve and index content from pages based on an indexing record; and a form processing module configured to:

identify a form page that is configured for use in requesting any of multiple target pages, the form page including multiple input controls;

enter a first set of values in the input controls, including a first value for a first input control, and receive a first requested target page in response;

enter a second set of values in the input controls, including a second value for the first input control, and receive a second requested target page in response;

perform a first comparison between the first and second requested target pages with regard to a predefined difference standard;

update the indexing record associated with the form page to reflect the first comparison;

determine that at least some of the multiple input controls retrieve target pages that satisfy the difference standard;

define pairs of the multiple input controls such that at least one input control in each pair has been determined to retrieve target pages that satisfy the difference standard;

wherein the second comparison is performed between respective target pages for the defined pairs;

wherein the indexing record is updated to reflect whether any of the defined pairs of input controls provide target pages that satisfy the difference standard.

19. The system of claim 18, wherein the first input control is configured to receive text string input, and wherein the form processing module formulates at least one text string input value for the first input control.

20. The system of claim 18, wherein the form processing module is further configured to subsequently determine whether the first input control in combination with at least a second one of the multiple input controls provide requested target pages that satisfy the difference standard.

21. The system of claim 20, wherein the form processing module is further configured to:

determine that at least some of the multiple input controls retrieve target pages that satisfy the difference standard;

define pairs of the multiple input controls such that at least one input control in each pair has been determined to retrieve target pages that satisfy the difference standard;

perform a second comparison between respective target pages for the defined pairs; and wherein the indexing record is updated to reflect whether any of the defined pairs of input controls provide target pages that satisfy the difference standard.

22. The system of claim 21, wherein the form processing module is further configured for:

forming input control tuples by extending those of the defined pairs found to provide target pages that satisfy the difference standard with at least another one of the multiple input controls;

performing a third comparison between respective target pages for the formed input control tuples; and updating the indexing record based on the third comparison.

* * * * *